United States Patent
Schlueter

[11] Patent Number: 5,803,603
[45] Date of Patent: Sep. 8, 1998

[54] PORTABLE THERMOSTAT TESTING DEVICE

[76] Inventor: Robert Lawrence Schlueter, 182 Farragut Rd., Cincinnati, Ohio 45218

[21] Appl. No.: 769,461

[22] Filed: Dec. 20, 1996

[51] Int. Cl.⁶ ............................ G01K 15/00; G01R 31/02
[52] U.S. Cl. .................................. 374/1; 236/94; 324/417
[58] Field of Search ................................ 374/1; 324/417; 236/94

[56] References Cited

U.S. PATENT DOCUMENTS

| | | | |
|---|---|---|---|
| 2,571,643 | 10/1951 | Younouse | 324/417 |
| 3,681,681 | 8/1972 | Auslander | 324/417 |
| 3,757,207 | 9/1973 | Hire | 374/1 |
| 3,902,351 | 9/1975 | Kreps | 374/1 |
| 3,947,758 | 3/1976 | Sutton | 374/1 |
| 4,160,152 | 7/1979 | Wightman et al. . | |
| 4,230,935 | 10/1980 | Meixner . | |
| 4,258,325 | 3/1981 | Richardson | 324/417 |
| 4,354,094 | 10/1982 | Massey et al. . | |
| 4,545,689 | 10/1985 | Dunavin et al. | 374/1 |
| 4,684,783 | 8/1987 | Gore . | |
| 4,848,925 | 7/1989 | Jacques | 374/1 |
| 5,229,580 | 7/1993 | Chioniere . | |
| 5,422,976 | 6/1995 | Knepler . | |
| 5,454,641 | 10/1995 | Parker et al. . | |

FOREIGN PATENT DOCUMENTS

| | | | |
|---|---|---|---|
| 0132898 | 11/1978 | Germany | 374/1 |
| 0386282 | 6/1973 | U.S.S.R. | 374/1 |
| 0964782 | 10/1982 | U.S.S.R. | 374/1 |

*Primary Examiner*—Diego F.F. Guiterrez
*Attorney, Agent, or Firm*—Killworth, Gottman, Hagan & Schaeff LLP

[57] ABSTRACT

A portable thermostat testing device for testing the trip temperature of a thermostat includes a testing block having a smooth, flat top surface, heat dissipating legs, a bore and a pair of grooves. A heater is positioned between the pair of grooves and a temperature probe is inserted in the bore. A fan is used to transfer heat to the testing block through convection. A thermostat to be tested is mounted on the top surface and the continuity of the thermostat's switch is monitored by a continuity checker. The testing block is heated by the heater and the temperature across the top surface is kept substantially uniform. The trip temperature is sensed by the temperature probe when the thermostat's switch opens. The testing device is mounted in a sturdy carrying case.

19 Claims, 3 Drawing Sheets

PORTABLE THERMOSTAT TESTING DEVICE

BACKGROUND OF THE INVENTION

The present invention relates to a portable thermostat testing device for testing thermostats used in any device that senses surface temperature. More specifically, the present invention relates to a portable thermostat testing device for testing thermostats used in electric hot water heaters.

A bimetallic snap disc thermostat is a temperature sensing device commonly used in electric hot water heaters. Bimetallic snap disc thermostats are well known in the art. Such thermostats usually include a switch which is operated with snap action in response to the snap movement of the disc when the disc reaches its calibration or trip temperature. Snap disc thermostats are designed to trip the switch at a predetermined temperature which can be adjusted by the user over a range of temperatures. Most residential hot water heaters may be adjusted to operate between the lower and upper design limits of 90 degrees and 165 degrees Fahrenheit, respectively. Commercial hot water heaters are designed to achieve temperatures upwards of 240 degrees Fahrenheit.

The thermostat in a hot water heater serves a very important function. The thermostat controls the temperature of the water in the tank by interrupting power to the heater coils when the water temperature reaches the trip temperature. A thermostat can fail or malfunction in variety of ways. First of all, the thermostat may be defective when manufactured such that the trip temperature exceeds the design capabilities of the water heater. Thermostat manufacturers typically test newly assembled thermostats in an oven and monitor the temperature at which the switch closes. However, the temperature gradient across the surface of the oven varies such that the test provides only a gross estimate of the thermostat trip temperature. It has been found that newly manufactured thermostats with design trip temperatures between 90 degrees and 165 degrees have had actual trip temperatures as high as 240 degrees. Trip temperatures in excess of 165 degrees may cause a failure of the hot water heater. Such a failure may lead to the mere inconvenience of having no hot water or more dangerous conditions, such as possible scalding or explosion of the water heater. Secondly, the thermostat may fail closed such that the heater coils continue to heat the water in the tank. A thermostat that has failed closed could also cause failure of the water heater with all of the above unpleasant consequences. Thirdly, the characteristics of the bimetallic disc may change over time such that the trip temperature exceeds the upper design limit. Fourthly, the thermostat may fail open such that the water in the tank is not heated.

An installer or repairer of hot water heaters needs to be able to accurately test the trip temperature of thermostats. Currently, repairers monitor the continuity between the electrical contacts of the thermostat while heating the bimetallic disc with a lighter or similar heating element. Such a method only provides an indication that the thermostat trips at some temperature. It fails to accurately indicate the true trip temperature of the thermostat. A lighter causes large temperature gradients across the surface of the disc such that it is a very inaccurate method to test the trip temperature. Unreliable information concerning the trip temperature of the thermostat could lead to frequent and sometimes unnecessary repairs. For example, an old thermostat may have a trip temperature in excess of the design limits of the hot water heater. Another safety device, such as the high limit switch or the temperature and pressure relief valve, may be triggered causing the hot water heater to shut down. A repairer may check the thermostat with a lighter and determine that the thermostat switch still trips at some temperature. The thermostat may be reinstalled and another device replaced. However, the same problem will return since the thermostat switches at a higher than expected trip temperature. Further, the old thermostat could simply be replaced. However, the new thermostat may be defective as discussed above. In either case, another service call will be required causing unnecessary expense and inconvenience for the repairer and owner. Currently, a portable and reliable thermostat testing device is not available.

Accordingly, there is a need in the art for a portable thermostat testing device which provides an accurate indication of the trip temperature of a thermostat. There is also a need for a portable thermostat testing device having a simple structure which is relatively inexpensive to manufacture.

SUMMARY OF THE INVENTION

The present invention meets the aforementioned needs by providing a portable thermostat device which is reliable and relatively inexpensive. The portable thermostat testing device according to the present invention comprises a testing block which interfaces with a thermostat to be tested, a heater assembly having a heater coupled to the testing block and electrically coupled to a power supply, a temperature sensor assembly coupled to the testing block to measure a temperature of the testing block, and a continuity checker having a first probe electrically coupled to the first terminal of the thermostat and a second probe electrically coupled to the second terminal of the thermostat. The temperature sensor assembly indicates the trip temperature of the thermostat when the continuity checker indicates an open circuit between the first and second terminals of the thermostat. Preferably, the testing block includes at least one mounting clip for securing the thermostat to the testing block.

According to another aspect of the present invention, the testing block includes a substantially flat top surface which interfaces with the thermostat. Preferably, the testing block may include a bore and the temperature sensor assembly may include a temperature probe mounted in the bore. The temperature sensor assembly may include a remote sensing thermometer coupled to the temperature probe.

According to yet another aspect of the present invention, the testing block may include a bottom section having a pair of grooved surfaces. The heater is preferably mounted between the pair of grooved surfaces. The heater is preferably a strip heater. The bottom section of the testing block may include at least one leg to dissipate heat from the testing block. Preferably, the testing block comprises a metallic material. More preferably, the metallic material includes aluminum.

According to yet another aspect of the current invention, the heater assembly may include a temperature control switch electrically coupled between the heater and the power supply. Preferably, the temperature control switch is a variable switch. The heater assembly may include a fan, a power switch, a heating pilot light, and a first series circuit in parallel with a second series circuit. The first series circuit may include a series connection of the power supply, the power switch, the temperature control switch, the heater and the heating pilot light. The second series circuit may include a series connection of the power supply, the power switch and the fan.

According to yet another aspect of the current invention, the continuity tester includes an indicator electrically coupled between the first and second probes. Preferably, one of the first and second probes includes a power supply. Preferably, the invention includes a carrying case for transporting the thermostat testing device.

A method of testing the trip temperature of a thermostat according to the present invention comprises the steps of: mounting the thermostat on a top surface of a testing block; applying heat to the testing block in a controlled manner such that the temperature across the top surface is substantially uniform; and monitoring the temperature across the top surface to determine the trip temperature.

Other objects and advantages of the invention will be apparent from the following description, the accompanying drawings and the appended claims.

DETAILED DESCRIPTION OF THE INVENTION

Figure 1:
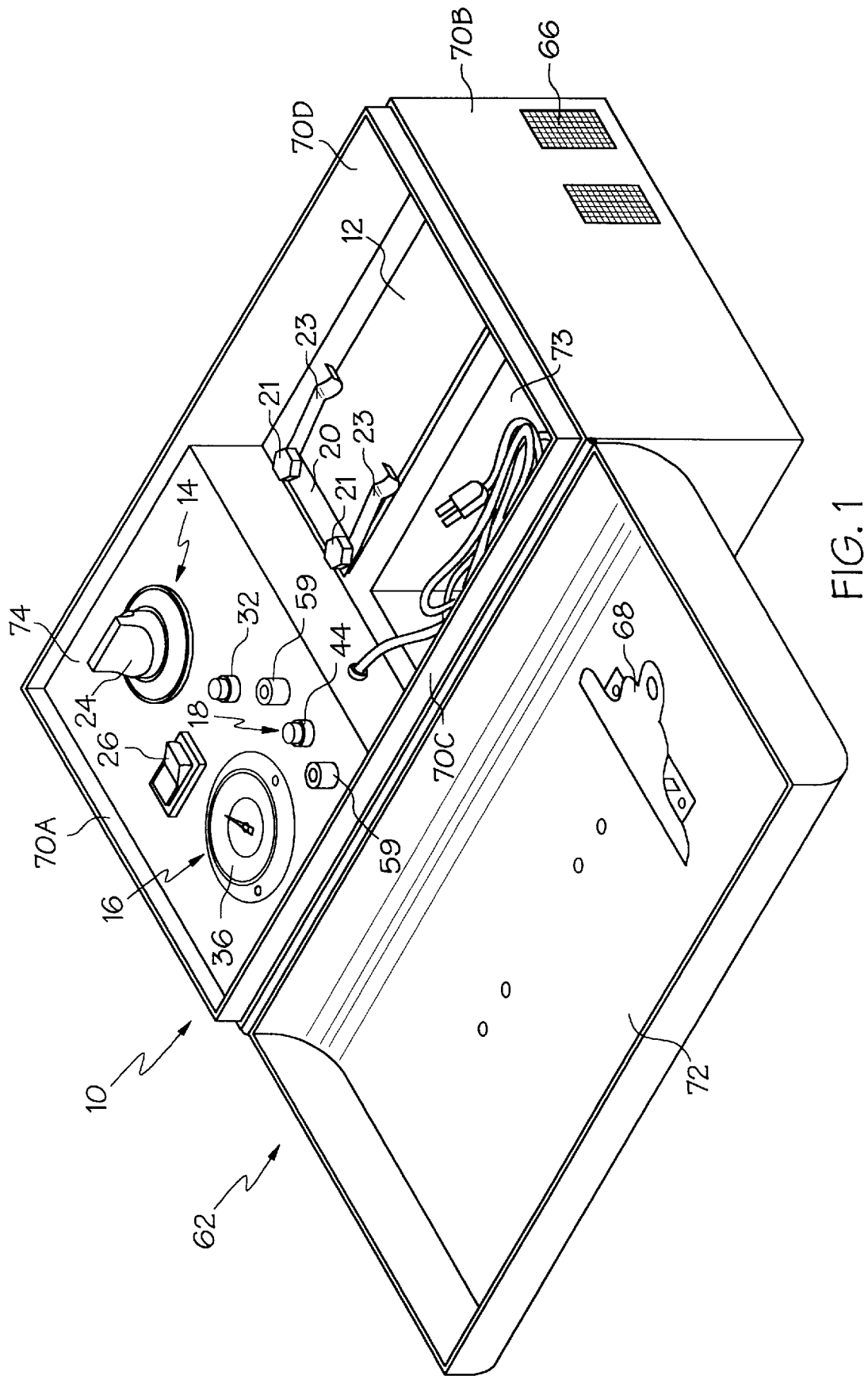
FIG. 1. is a perspective view of a portable thermostat testing device of the present invention.
Figure 2:
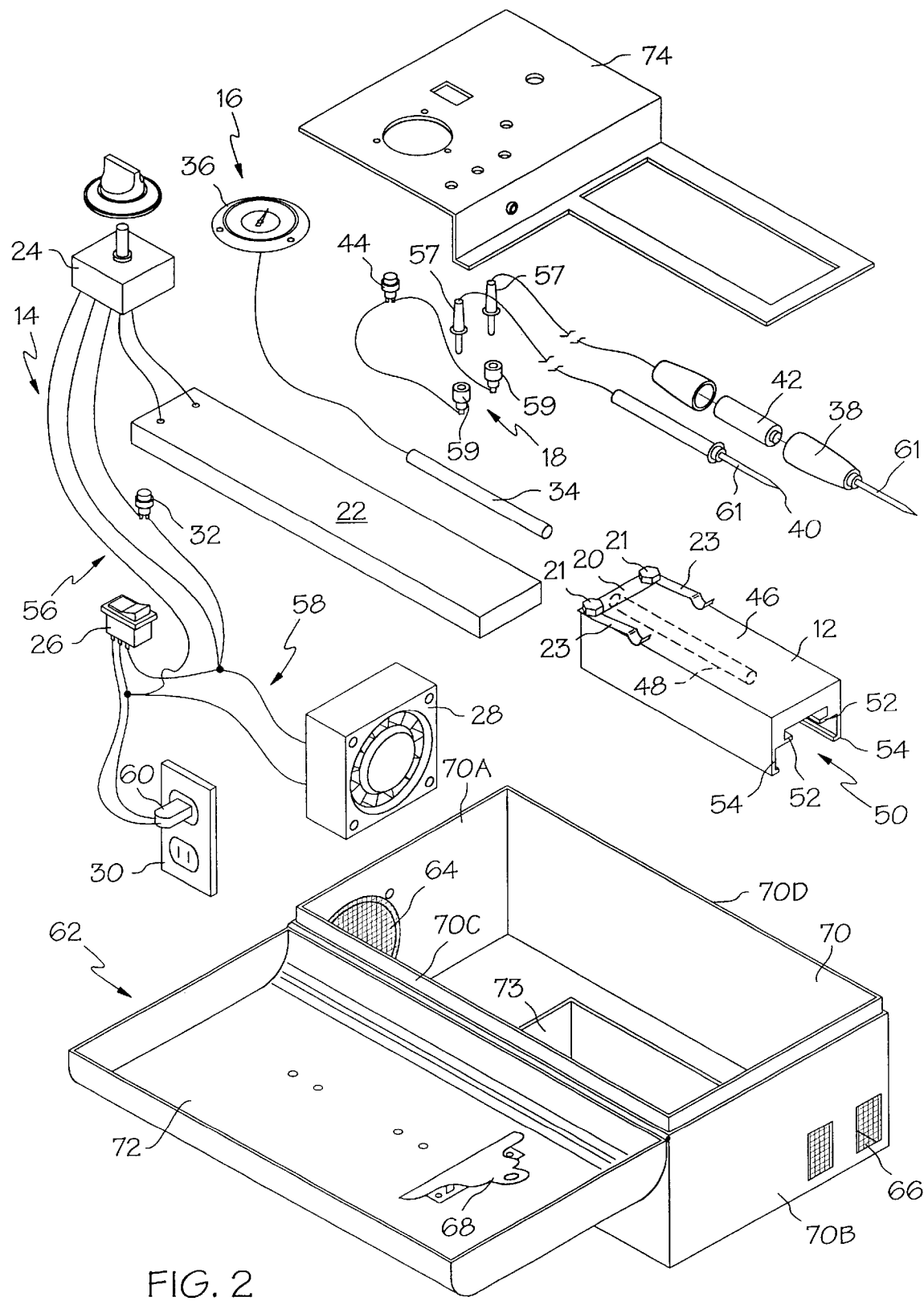
FIG. 2 is an exploded view of the portable thermostat testing device of FIG. 1.

Referring now to FIG. 1, a portable thermostat testing device 10 is shown according the present invention. The portable thermostat testing device 10 comprises a testing block 12, a heater assembly 14, a temperature sensor assembly 16 and a continuity checker 18; see also FIG. 2. The testing block 12 includes a mounting clip 20. Referring to FIG. 2, the heater assembly 14 includes a strip heater 22, a variable switch 24, a power switch 26, a fan 28, a power supply 30 and a heating pilot light 32. The temperature sensor assembly 16 includes a temperature probe 34 and a remote sensing thermometer 36. The continuity checker 18 includes a first probe 38, a second probe 40, a power supply 42 and an indicator 44.

The testing block 12 includes a top surface 46, a bore 48 beneath the top surface 46, and a bottom section 50. The bottom section 50 includes a pair of grooved surfaces 52 and legs 54; see also FIGS. 3 and 4. The thermostat to be tested (not shown) is mounted on the top surface 46 by the mounting clip 20 such that the bimetallic disc of the thermostat to be tested is in direct contact with the top surface 46. The mounting clip 20 is coupled to the testing block 12 by fasteners 21. The mounting clip 20 is shown with a pair of arms 23. However, it will be appreciated by those skilled in the art that the mounting clip 20 may be composed of one or more arms to provide sufficient contact between the thermostat to be tested and the top surface 46. It will also be appreciated by those skilled in the art that the thermostat to be tested may be mounted to the top surface 46 by one or more mounting clips 20. It will be further appreciated by those skilled in the art that the thermostat to be tested may be merely placed on the top surface 46 or mounted to the top surface 46 by other types of mounting devices, such as hooks, bolts or wire.

As shown in FIG. 2, the temperature probe 48 is mounted inside the bore 48. The top surface 46 is designed to accommodate the bimetallic disc of the thermostat to be tested and the temperature probe 48. The heater strip 22 is mounted between the pair of grooved surfaces 52. Preferably, the pair of grooved surfaces are crimped to secure the heater strip 22 to the testing block 12. The heater strip 22 runs along the entire length of testing block 12 to supply a constant and evenly distributed amount of heat to the testing block 12. It will be appreciated by those skilled in the art that the heater strip 22 may be positioned on the sides or top of the testing block 12. It will also be appreciated by those skilled in the art that the heater strip may be bolted or adhesively secured to the testing block 12.

The heater assembly 14 includes a first series circuit 56 and a second series circuit 58. The first series circuit 56 includes a series connection of the power supply 30, the power switch 26, the heating pilot light 32, the variable switch 24 and the heater strip 22. The second series circuit 58 includes a series connection of the power supply 30, the power switch 26 and the fan 28. The first series circuit 56 is in parallel with the second series circuit 58 such that the circuits function independent of each other. Preferably, power supply 30 is a standard 110 volt power outlet. Power is supplied to the portable thermostat testing device through a standard outlet plug 60. The standard outlet plug 60 is simply plugged into a standard residential outlet. It will be appreciated by those skilled in the art that a properly sized battery may be used as the power supply 30.

Figure 3:
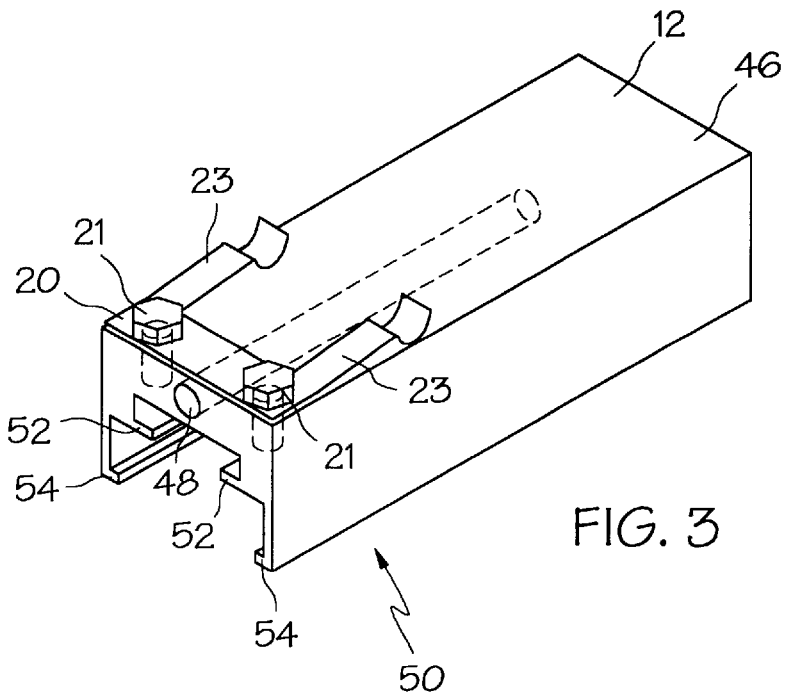
FIG. 3 is a perspective view of a top portion of a testing block of the portable thermostat testing device of FIG. 1.

The testing block 12 is preferably composed of a material having high thermal conductivity. Preferably, the testing block 12 is formed of high thermal conductive metallic material, such as aluminum. Thermal conductivity is a measure of the rate at which heat is transferred through a material. Materials with high thermal conductivity transfer heat through the material quickly, yielding more uniform surface temperatures. The top surface 46 is preferably substantially flat and smooth as shown in FIGS. 2 and 3. The flat top surface 46 provides good physical and thermal contact with the thermostat to be tested such that the heat transfer between the testing block 12 and the thermostat to be tested is constant and uniform. It will be appreciated by those skilled in the art that other metals with high thermal conductivity may be used to form the testing block 12. It will be also be appreciated by those skilled in the art that materials other than metal with high thermal conductivity may be used to form the testing block 12.

Figure 4:
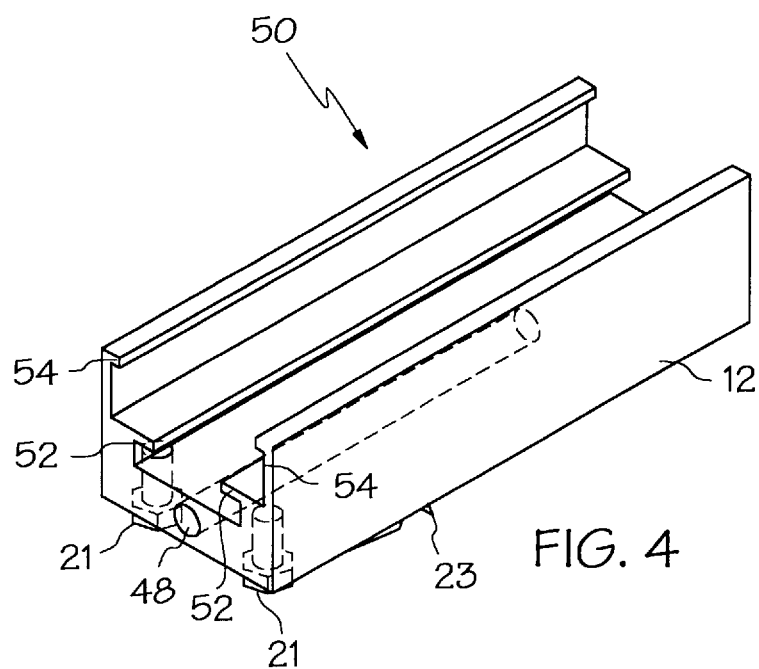
FIG. 4 is a perspective view of a bottom portion of the testing block of the portable thermostat testing device of FIG. 1.

Further, the testing block 12 also has sufficient mass to distribute the heat evenly without extreme temperature variations. Referring to FIGS. 2, 3 and 4, the legs 54 are used to help distribute the heat evenly and to aid in cooling the testing block 12 when the test is completed. Legs 54 provide additional surface area to increase the amount of heat dissipation in the testing block 12. While two legs 54 are shown in the illustrated embodiment, it will be appreciated by those skilled in the art that one or more legs may be used to increase the amount of heat dissipation in the testing block 12. Referring to FIG. 2, the fan 28 is also used to distribute the heat evenly to the testing block 12. The fan 28 provides convective heat transfer so that localized hot spots along the testing block 12 are reduced or eliminated. It is important that the top surface 46 is heated uniformly so that an accurate measurement of the trip temperature of the thermostat to be tested may be made. Hot spots along the testing block 12 could cause the remote probe 34 to sense a higher than expected temperature. Conversely, if the hot spot is on the top surface 46, then remote probe may sense a lower than expected temperature. The testing block 12 with sufficient mass, smooth, flat top surface 46, the legs 54 and the fan 28 yields a substantially uniform temperature across the testing surface 46.

Since the temperature across the top surface 46 is substantially uniform, the temperature sensed by the remote probe 34 in the bore 48 will be extremely accurate. Placement of the temperature probe 34 within the testing block 12 provides an accurate temperature measurement of the testing block 12. The temperature probe 34 is not influenced by any extraneous heating or cooling sources since it is basically integral with the testing block 12. It will be appreciated by those skilled in the art that the temperature probe 34 may be placed in other locations. For example, the temperature probe 34 may be place directly on the top surface 46 and still yield accurate temperature measurements.

The temperature sensor assembly 16 comprises the temperature probe 34 and the remote thermometer 36. The remote thermometer 36 provides a visual indication of the temperature sensed by the temperature probe 34. The remote thermometer 36 should have an operating range of up to at least 240 degrees. Those skilled in the art will appreciate that the operating range of the remote thermometer 36 will be dependent on the characteristics of the thermostats to be tested. The remote thermometer 36 may display an analog or digital representation of the temperature. In the illustrated embodiment, the remote thermometer 36 provides an analog representation through a standard temperature gauge having a reading arm and temperature graduations on a dial. It will be appreciated by those skilled in the art that other types of temperature sensing devices may be used. For example, a thermometer may be placed directly in the bore 48.

The first series circuit 56 is configured to control the amount of heat supplied to the testing block 12. Bimetallic thermostats have slow reaction times such that it is important to control the amount of heat provided to the testing block 12. Once the power switch 26 is activated, the first series circuit is controlled by the variable switch 24. The amount of current supplied to the heater is controlled by turning the variable switch 24 to the desired position. The variable switch 24 functions in the same manner as a common switch to an electric stove in that it can be set to any position between "OFF" and "HIGH" to generate the desired amount of heat. The second series circuit 58 operates independent of the first series circuit such that the fan 28 operates as long as power switch 26 remains activated. This is an important feature for two reasons. First of all, convective air from fan 28 helps cool the testing block 12 quickly after the test is completed and the heater strip is turned off. Second, independent action of the second series circuit 58 ensures that the fan 28 is always on before heat is supplied to the testing block 12. As stated above, the fan 28 is an important factor in maintaining a substantially uniform temperature across top surface 46. Once power switch 26 is activated, the fan 28 initiates the flow of convective air across the testing block 12 so that the top surface 46 has a substantially uniform temperature.

The continuity checker 18 includes the first probe 38, the second probe 40, the power supply 42 and the indicator 44. The power supply 42 is preferably included with the first probe 38 or the second probe 40. However, it will be appreciated by those skilled in the art that the power supply 42 may be separate from the first probe 38 and the second probe 40. The indicator 44 is a light bulb in the illustrated embodiment. However, it will be appreciated by those skilled in the art that the indicator 48 may be any device that senses current flow, such as an amp meter or ohm meter. The first and second probes 38, 40 include banana plugs 57 while the indicator 44 includes a pair of banana jacks 59. The banana plugs 57 of the first and second probes 38, 40 interface with the banana jacks of the indicator. The first probe 38, the second probe 40, the power supply 40 and the indicator 44 are coupled in series with the switch terminals (not shown) of the thermostat to be tested. Preferably, the first probe 38 and the second probe 40 are electrically coupled to the switch terminals of the thermostat to be tested through conductive connector 61. It will be appreciated by those skilled in the art that other types of connectors may be used, such as alligator clips. A complete circuit will be formed when the switch (not shown) of the thermostat to be tested is closed. The thermostat switch is normally closed when the thermostat is below the trip temperature and open when the thermostat is above the trip temperature. The indicator 44 will shine until the thermostat to be tested is heated to its trip temperature. Once the trip temperature is reached, the thermostat's switch should open and the indicator 44 will go out.

Referring to FIGS. 1 and 2, the portable thermostat testing device 10 is housed in a carrying case 62. The carrying case 62 includes an intake port 64, an exhaust port 66, a carrying handle (not shown), fastening clips (not shown), bottom section 70 and top section 72. The bottom section 70 includes a storage compartment 72 for storing the first probe 38, the second probe 40 and the outlet plug 60. The bottom section 70 also includes a control panel 74 which provides a mounting surface for the variable switch 24, the power switch 26, the remote thermometer 36, the heating pilot light 42, the indicator 44 and the banana jacks 59.

The fan 28 is located on a first side 70a of the bottom section 70 and the exhaust port 66 is located on a second side 70b of the bottom section 70. As shown in the illustrated embodiment, the first side 70a is opposite the second side 70b. Outside air is drawn in by the fan 28 through the intake port 64 and inside air is expelled through the exhaust port 66. It will be appreciated by those skilled in the art that the fan 28 could be configured to expelled air while drawing in outside air through exhaust port 66. The fan 28 and the exhaust port 64 are located on opposite ends of the bottom section 70 so that a steady flow of air is drawn across the testing block 12. The top section 72 is hinged on a third side 70c of the bottom section 70 and is locked in placed with the clips on a fourth side 70d of the bottom section 70. The carrying case 62 is easily carried by the carrying handle. Preferably, the carrying case 62 is composed of a lightweight and durable material, such as aluminum. The carrying case 62 needs to be lightweight and durable because it is portable and must be able to withstand the rigors of constant use and abuse. It will be appreciated by those skilled in the art that other lightweight and durable materials may be used to from the carrying case 62.

The portable thermostat testing device 10 of the present invention is used as follows. The thermostat to be tested is placed on the top surface 46 and fastened to testing block 12 through mounting clip 20. The first and second probes 38, 40 are attached to the banana jacks 59 through the banana plugs 57. The conductive probe connectors 61 are then electrically coupled to the switch terminals of the thermostat to be tested. The indicator 44 should be glowing. The outlet plug 60 is plugged into a standard residential outlet and the power switch 26 is activated. The fan 28 provides convective air through the bottom section 70 and to the testing block 12. The variable switch 24 is turned to the desired position, turning on the heating pilot light 32 and supplying current to the strip heater 22. The testing block 12 is heated and a uniform temperature is maintained across the top surface 46. The temperature probe 34 senses the temperature of the testing block 12 and a visual indication of the temperature is displayed by the remote thermometer 36. The temperature is slowly increased by adjusting the variable switch 24. The temperature is noted once the indicator 44 stops glowing. The noted temperature indicates the trip temperature of the thermostat. The variable switch 24 is turned off and the fan 28 continues to cool the testing block 12 through convection. Once a safe temperature is reached, the thermostat to be tested is removed from the testing block 12. The first and second probes are removed from the switch terminals of the thermostat and the banana jacks 57, and then returned to the storage compartment 73. The power switch 26 is turned off once the testing block 12 has reached a safe temperature. The outlet plug 60 is unplugged from the wall and replaced in the storage compartment 73. The carrying case 62 is closed and transported to the next testing location.

A method for measuring the trip temperature of a thermostat is as follows. The thermostat to be tested is mounted on the top surface 46 of the testing block 12. Heat is applied to the testing block 12 in a controlled manner so that the temperature across the top surface 46 is substantially uniform. As discussed above, the temperature of the top surface 46 is substantially uniform through the mass of testing block 12, the flat top surface 46, the fan 28 and the legs 54. The temperature of the testing block 12 is monitored until the trip temperature of the thermostat is determined. The trip temperature is reached once the continuity checker 18 indicates that the switch in the thermostat to be tested is open.

Having described the invention in detail and by reference to preferred embodiments thereof, it will be apparent that modifications and variations are possible without departing from the scope of the invention which is defined in the appended claims.

What is claimed is:

1. A thermostat testing device for testing a thermostat having a trip temperature, a first terminal and a second terminal, said thermostat testing device comprising:
    a testing block having a substantially flat top surface, at least one mounting clip on said substantially flat top surface, a bore, a bottom section having a pair of grooved surfaces and at least one leg to dissipate heat from said testing block, said thermostat to be tested mounted to said substantially flat top surface by said at least one mounting clip;
    a heater assembly having a heater mounted between said pair of grooved surfaces, a variable control switch, a fan, a power switch, a heating pilot light, and a first series circuit in parallel with a second series circuit, said first series circuit includes a series connection of a power supply, said power switch, said variable control switch, said heater and said heating pilot light, and said second series circuit includes a series connection of said power supply, said power switch and said fan;
    a temperature sensor assembly having a temperature probe mounted in said bore of said testing block and a remote sensing thermometer coupled to said temperature probe; and
    a continuity checker having a first probe electrically coupled to said first terminal of said thermostat, a second probe electrically coupled to said second terminal of said thermostat, and an indicator light electrically coupled between said first and second probes, one of said first and second probes includes a power supply;
    wherein said remote thermometer indicates said trip temperature of said thermostat when said indicator light of said continuity checker indicates an open circuit between said first and second terminals of said thermostat.

2. A portable thermostat testing device for testing a thermostat having a trip temperature, a first terminal and a second terminal, said thermostat testing device comprising:
    a testing block interfacing with said thermostat to be tested, said testing block including a bottom section having at least one leg to dissipate heat therefrom;
    a heater assembly having a heater coupled to said testing block and electrically coupled to a power supply;
    a temperature sensor assembly coupled to said testing block to measure a temperature of said testing block; and
    a continuity checker having a first probe electrically coupled to said first terminal of said thermostat and a second probe electrically coupled to said second terminal of said thermostat; wherein said bottom section of said testing block further includes a pair of grooved surfaces, and said heater is mounted between said pair of grooved surfaces; and
    wherein said temperature sensor assembly indicates said trip temperature of said thermostat when said continuity checker indicates an open circuit between said first and second terminals of said thermostat.

3. The thermostat testing device of claim 2 wherein said testing block includes at least one mounting clip for securing said thermostat to said testing block.

4. The thermostat testing device of claim 3 wherein said testing block has a bore and said temperature sensor assembly includes a temperature probe mounted in said bore.

5. The thermostat testing device of claim 4 wherein said temperature sensor assembly includes a remote sensing thermometer coupled to said temperature probe.

6. The thermostat testing device of claim 2 wherein said heater is a strip heater.

7. The thermostat testing device of claim 2 wherein said heater assembly includes a control switch electrically coupled between said heater and said power supply.

8. The thermostat testing device of claim 2 wherein said control switch is a variable switch.

9. The thermostat testing device of claim 2 wherein said heater assembly includes a fan electrically coupled to said power supply.

10. The thermostat testing device of claim 2 wherein said continuity tester includes an indicator light electrically coupled between said first and second probes.

11. The thermostat testing device of claim 10 wherein one of said first and second probes includes a power supply.

12. The thermostat testing device of claim 2 wherein said testing block is made of a metallic material.

13. The thermostat testing device of claim 12 wherein said metallic material comprises aluminum.

14. The thermostat testing device of claim 2 further comprising a carrying case for transporting said thermostat testing device.

15. A portable thermostat testing device for testing a thermostat having a trip temperature, a first terminal and a second terminal, said thermostat testing device comprising:
    a testing block interfacing with said thermostat to be tested;
    a heater assembly having a heater coupled to said testing block and electrically coupled to a power supply, said heater assembly further comprising a fan electrically coupled to said power supply;
    a temperature sensor assembly coupled to said testing block to measure a temperature of said testing block; and
    a continuity checker having a first probe electrically coupled to said first terminal of said thermostat and a second probe electrically coupled to said second terminal of said thermostat;
    wherein said temperature sensor assembly indicates said trip temperature of said thermostat when said continuity checker indicates an open circuit between said first and second terminals of said thermostat.

16. The thermostat testing device of claim 15 wherein said testing block has a bore and said temperature sensor assembly includes a temperature probe mounted in said bore.

17. The thermostat testing device of claim 16 wherein said temperature sensor assembly includes a remote sensing thermometer coupled to said temperature probe.

18. The thermostat testing device of claim 15 wherein said heater assembly includes a variable control switch electrically coupled between said heater and said power supply.

19. The thermostat testing device of claim 15 further comprising a carrying case for transporting said thermostat testing device.

* * * * *